(12) United States Patent
Waters et al.

(10) Patent No.: US 11,030,638 B2
(45) Date of Patent: Jun. 8, 2021

(54) SYSTEM AND METHOD FOR TIME AND SPACE BASED DIGITAL AUTHENTICATION FOR IN-PERSON AND ONLINE EVENTS

(71) Applicant: Autography LLC, St. Petersburg, FL (US)

(72) Inventors: Thomas J. Waters, St. Petersburg, FL (US); Robert N. Barrett, St. Petersburg, FL (US)

(73) Assignee: Autography LLC, St. Petersburg, FL (US)

( * ) Notice: Subject to any disclaimer, the term of this patent is extended or adjusted under 35 U.S.C. 154(b) by 1069 days.

(21) Appl. No.: 14/970,785

(22) Filed: Dec. 16, 2015

(65) Prior Publication Data

US 2016/0171524 A1 Jun. 16, 2016

Related U.S. Application Data

(60) Provisional application No. 62/092,618, filed on Dec. 16, 2014.

(51) Int. Cl.
*G06Q 30/02* (2012.01)
*H04L 29/06* (2006.01)
*H04L 9/32* (2006.01)
*G06F 16/29* (2019.01)

(52) U.S. Cl.
CPC ......... *G06Q 30/0225* (2013.01); *G06F 16/29* (2019.01); *G06Q 30/0207* (2013.01); *G06Q 30/0236* (2013.01); *G06Q 30/0252* (2013.01); *H04L 9/3231* (2013.01); *H04L 9/3297* (2013.01); *H04L 63/0861* (2013.01); *H04L 63/107* (2013.01)

(58) Field of Classification Search
CPC .......... G06Q 30/0207; G06Q 30/0251; G06Q 30/0252; G06Q 30/0261; G06Q 30/0236
See application file for complete search history.

(56) References Cited

U.S. PATENT DOCUMENTS

| 2004/0031046 A1* | 2/2004 | Weinblatt ......... H04N 21/44008 725/23 |
| 2007/0050832 A1* | 3/2007 | Wright ............. H04N 21/42203 725/115 |
| 2008/0205860 A1* | 8/2008 | Holtman .............. H04N 21/435 386/330 |
| 2009/0044216 A1* | 2/2009 | McNicoll ............... H04N 7/173 725/5 |

(Continued)

OTHER PUBLICATIONS

'Beam US out Scottie! Virtual Book Signings: How to be there virtually, or be square'. Joy of Tech [online], published on Apr. 12, 2004 [retrieved on Mar. 18, 2021], Retrieved from the Internet: <http://www.joyoftech.com/joyoftech/joystuff/virtualbooksigning/virtualbooksigning.html>. (Year: 2004).*

*Primary Examiner* — Waseem Ashraf
*Assistant Examiner* — Jonathan J Whitaker
(74) *Attorney, Agent, or Firm* — Shumaker, Loop & Kendrick, LLP

(57) ABSTRACT

Disclosed is a method for issuing a redeemable electronic reward in real-time to an event participant in response to event attendance. The redeemable reward may include a gift card, backstage passes to the event, tickets and backstage passes to a future live event, digital memorabilia from the event, and combinations thereof.

6 Claims, 3 Drawing Sheets

(56) References Cited

U.S. PATENT DOCUMENTS

| | | | |
|---|---|---|---|
| 2011/0145041 A1* | 6/2011 | Salamatov | G06Q 30/02 705/7.35 |
| 2011/0208655 A1* | 8/2011 | Steelberg | G06Q 30/08 705/50 |
| 2012/0023516 A1* | 1/2012 | Wolinsky | H04N 21/6582 725/12 |
| 2012/0230539 A1* | 9/2012 | Caiman | G06Q 10/06 382/103 |
| 2012/0230540 A1* | 9/2012 | Caiman | G06K 9/00221 382/103 |
| 2012/0233072 A1* | 9/2012 | Calman | G06Q 40/02 705/44 |
| 2013/0063561 A1* | 3/2013 | Stephan | H04N 13/302 348/46 |
| 2013/0132230 A1* | 5/2013 | Gibson | H04L 67/22 705/26.8 |
| 2013/0138967 A1* | 5/2013 | Auld | H04L 9/3231 713/180 |
| 2013/0232194 A1* | 9/2013 | Knapp | H04L 67/22 709/203 |
| 2013/0311565 A1* | 11/2013 | Barry | G06F 21/10 709/204 |
| 2015/0073907 A1* | 3/2015 | Purves | G06Q 20/32 705/14.58 |
| 2015/0278780 A1* | 10/2015 | Vaidyanathan | G06Q 20/405 705/42 |
| 2017/0018184 A1* | 1/2017 | Northrup | G08G 1/144 |

* cited by examiner

SYSTEM AND METHOD FOR TIME AND SPACE BASED DIGITAL AUTHENTICATION FOR IN-PERSON AND ONLINE EVENTS

CROSS-REFERENCE TO RELATED APPLICATION

This application claims priority from U.S. Provisional Patent Application No. 62/092,618 filed on Dec. 16, 2014, the contents of which are incorporated by reference herein.

TECHNICAL FIELD AND BACKGROUND OF THE INVENTION

The present invention relates generally to the field of digital media, and more particularly, to systems and methods for issuing a redeemable electronic reward in real-time to an event participant in response to event attendance.

Over the past two decades, digital venues and digital activities including social media have grown at an exponential rate, directly coinciding with the advent and ever increasing popularity of the interne. While these digital venues and digital activities have immensely enhanced global communication and educational tools, certain industries, such as the music and sporting industries, have been greatly harmed by these venues and activities due to piracy (e.g., digital piracy).

For example, many fans attend concerts and/or sporting events and enable and participate in unlicensed/unsanctioned streaming of these events. Unlicensed/unsanctioned streaming of these live events often diverts potential attendees away from these events thereby limiting the revenues these concerts and/or sporting events can generate and reducing overall profitability. These types of pirating activities subsequently drives up ticket prices and increases the likelihood of recurrent and increased piracy, which is a vicious cycle that further reduces profitability of a particular event and further inhibits the ultimate viability of these events.

Although piracy is illegal and ultimately detriments celebrities, musicians, and athletes, piracy has become widespread and accepted. Therefore, the above mentioned types of piracy need to be counteracted to maintain viability for certain industries (e.g., the music industry and/or the sporting industry).

BRIEF SUMMARY

The disclosed method and systems for issuing a redeemable electronic reward to an event participant in response to event attendance counteracts the above discussed piracy problems. These methods and systems help prevent or reduce piracy by rewarding streaming consumers who only attend/watch/listen through authorized/official streaming channels. These methods and systems incentivize event participants (e.g., fans) with, for example, autographed and/or personalized digital media that is made available only to verified fans (event participants) participating live or through officially sanctioned services provided by the artist or their designee (management, team, label, venue, etc.).

Disclosed is a method for issuing a redeemable electronic reward to an event participant in response to event attendance, the method including: (a) establishing a timeframe and geographic location for qualifying the event participant to participate in an event; (b) transmitting a first signal during the event to a peripheral device of the event participant; (c) receiving, by the peripheral device of the event participant, the first signal transmitted during step (b) to identify geographic location by global positioning coordinates of the event participant; (c) transmitting, by the peripheral device of the event participant, a second signal having the identified geographic location by global positioning coordinates of the event participant to a central database responsive to receiving the first signal by the peripheral device of the event participant; (d) associating a timestamp including the geographic location of the event participant during the event upon receiving the second signal by the central database; (e) verifying the timestamp and determining whether the event participant qualifies for the redeemable electronic reward based the timeframe and geographic location identified in the timestamp; (f) optionally authenticating event participant identity before communicating the redeemable electronic reward to the event participant; and (g) communicating the redeemable electronic reward in to the event participant upon determining event participant qualification to participate in the event, wherein: the redeemable electronic reward includes at least one of a gift card, backstage passes to the event, tickets and backstage passes to a future live event, digital memorabilia from the event, and combinations thereof. In certain aspects, the disclosed methods occur in real-time and utilize a combination of time and participation data from the event to communicate and/or issue rewards to participants. In certain aspects, participation and authentication is associated with the specific carrier signal and time/date confirmation by a host computer. In certain aspects, the time/date stamp is crucial, and once the event (e.g., concert, game, etc.) is over, incentives (e.g., redeemable electronic reward) are no longer available/obtainable.

In certain aspects, the method includes authenticating event participant identity before communicating the redeemable electronic reward to the event participant. In certain aspects, the disclosed methods consist of steps (a)-(g).

In certain aspects, authenticating event participant identity includes verifying the event participant's account information from their device (e.g., Apple account, Apple Pay account, Google Play account, YouTube account, etc.), a biometric parameter associated with the event participant's identity, or a combination thereof.

In certain aspects, the biometric parameter includes an electronic fingerprint of the event participant, facial recognition of the event participant, or a combination thereof.

In certain aspects, the biometric parameter includes an electronic fingerprint of the event participant and facial recognition of the event participant in which a 95% confidence level must be achieved before communicating the redeemable electronic reward to the event participant.

In certain aspects, the biometric parameter includes an electronic fingerprint of the event participant and facial recognition of the event participant in which a 99% confidence level must be achieved before communicating the redeemable electronic reward to the event participant.

In certain aspects, the electronic reward is digital memorabilia from an author, musician, or athlete conducting the event.

In certain aspects, the digital memorabilia is an electronic autograph, an electronic written message, an electronic video message, or a combination thereof, which optionally includes a certificate of authentication. In certain aspects, the digital memorabilia is an electronic autograph, an electronic written message, an electronic video message, or a combination thereof including a certificate of authentication.

In certain aspects, the digital memorabilia may be transferable from the event participant's peripheral device to another person's peripheral device for other forms of digital memorabilia or for remuneration. In certain aspects, the number of exchanges may be limited to one exchange between the event participant and another person (i.e., another person's peripheral device) thereby limiting the re-distribution of the electronic redeemable reward.

In one embodiment of the invention, a signal (e.g., the first signal) is embedded in a broadcast tv program and collected in the viewer's smartphone/tablet.

In another embodiment, a signal (e.g., the first signal) is transmitted during a live concert or athletic event and captured by the attendee's smartphone/tablet.

In another embodiment a signal (e.g., the first signal) is transmitted during a live-streamed broadcast of an event over the Internet and captured by the viewer's smartphone/tablet.

In another embodiment, the smartphone/tablet transmits its local GPS data (e.g., the second signal) to confirm the attendee's location in a venue.

In another embodiment, the device's presence on a website (or viewing application) is transmitted along with the broadcast signal.

In another embodiment, the smartphone/tablet can capture video of an event in addition to or instead of a separate broadcast signal.

In another embodiment, an author could invite fans to watch a TV episode he or she is participating in. Even in reruns, the network could include a text crawl instructing fans to sign on and request a personalized piece of media (ebook or photograph).

In another embodiment, the system and methods can be used during a digital-only broadcast via YouTube, Ustream, Skype, or similar streaming technology service. In certain aspects and even if fans that don't receive a reward for one specific event, the fans/participants can still compile an overall record of 'attendance' by participating through the authorized channel rather than through unauthorized and/or consumer-captured services (Periscope, etc.).

In another embodiment, the system and methods are used to confirm participation in video gaming, either live or online, to include Massive Multiplayer Online Gaming (MMOG) play, tournaments, or events.

In another embodiment, the broadcast signal could be included in a terrestrial or online radio or television broadcast where an artist is appearing, allowing listeners to participate within a very narrow window of time.

It is also envisioned that artists or athletes (event providers) could also appear live during the rebroadcast of previously recorded event, effectively participating 'alongside' fans and rewarding the attendance of the rebroadcast show. Old movies, prior concerts, or historic sporting events that are rebroadcast could include a livestream of an original participant who watches or listens alongside their fans. The fan's participation in this joint rebroadcast and celebrity live stream can be authenticated to allow the celebrity to reward the fan's participation with autographed and/or personalized digital media, in addition to physical rewards such as a poster or t-shirt, or other tangible items.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION

Figure 1:
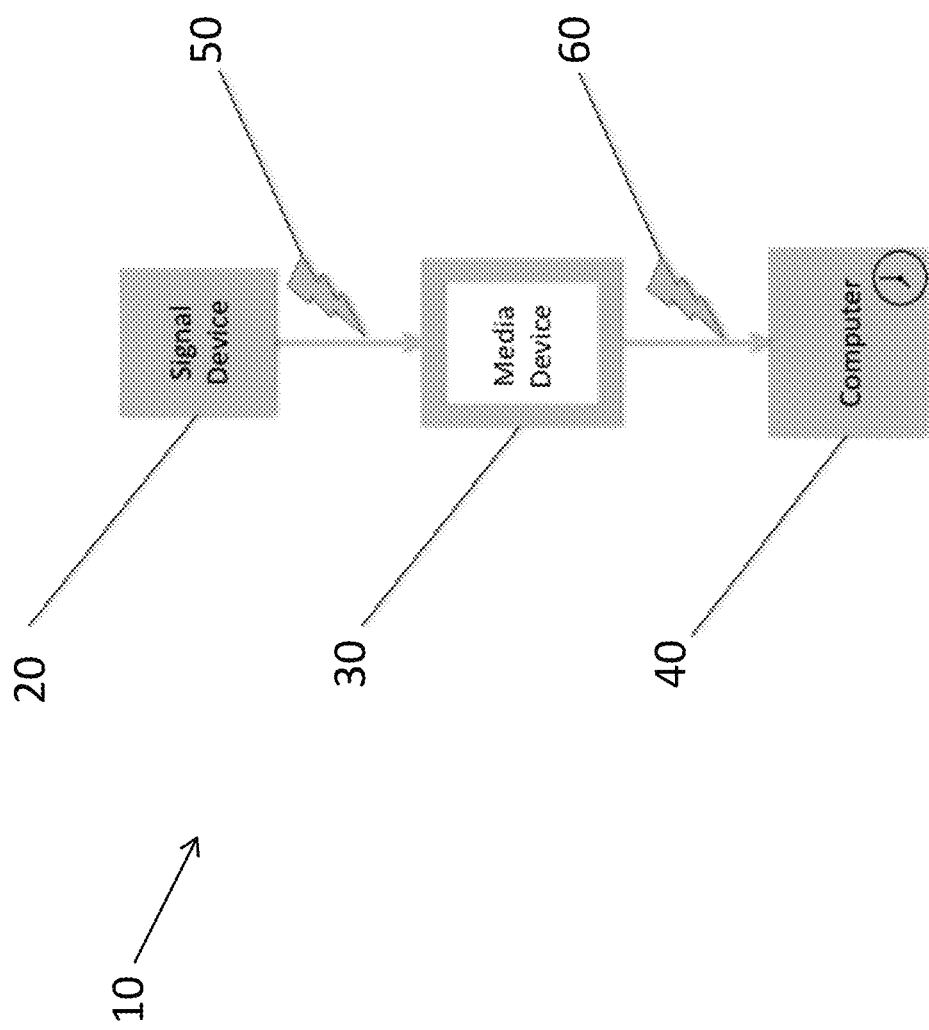
FIG. 1 depicts exemplary signal transmissions during an event to confirm an event participant's participation in an event.

The present invention will now be described more fully hereinafter with reference to the accompanying drawings in which exemplary embodiments of the invention are shown. In particular, the present invention is described below with reference to block diagrams and operational illustrations of methods, systems, and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently. The invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Generally, in terms of hardware architecture for the electronic devices disclosed below, computing device includes a processor, a memory, and one or more input and/or output (I/O) devices (or peripherals) that are communicatively coupled via a local interface. Local interface may be one or more buses or other wired or wireless connections, as is known in the art. Local interface may have additional elements, which are omitted for simplicity, such as controllers, buffers (caches), drivers, transmitters, and receivers to facilitate external communications with other like or dissimilar computing devices. Further, local interface may include address, control, and/or data connections to enable internal communications among the other computer components.

The processor is a hardware device for executing software, particularly software stored in memory. The processor can be any custom made or commercially available processor, such as, for example, a Core series or vPro processor made by Intel Corporation, or a Phenom, Athlon or Sempron processor made by Advanced Micro Devices, Inc. In the case where computing device is a server, the processor may be, for example, a Xeon or Itanium processor from Intel, or an Opteron-series processor from Advanced Micro Devices, Inc. Processor may also represent multiple parallel or distributed processors working in unison. Processor may also represent multiple processors located in a plurality of computing devices working in parallel, unison, or serial effort to achieve the disclosed methods.

Memory can include any one or a combination of volatile memory elements (e.g., random access memory (RAM, such as DRAM, SRAM, SDRAM, etc.)) and nonvolatile memory elements (e.g., ROM, hard drive, flash drive, CDROM, etc.). It may incorporate electronic magnetic, optical, and/or other types of storage media. Memory can have a distributed architecture where various components are situated remote from one another, but are still accessed by processor. These other components may reside on devices located elsewhere on a network or in a cloud arrangement.

The software in memory may include one or more separate programs. The separate programs comprise ordered listings of executable instructions for implementing logical functions. The software in memory may include the system in accordance with the invention, and a suitable operating system (O/S). Examples of suitable commercially available operating systems are Windows operating systems available from Microsoft Corporation, Mac OS X available from Apple Computer, Inc., a Unix operating system from AT&T, or a Unix-derivative such as BSD or Linux. The operating system O/S will depend on the type of computing device. For example, if the computing device is a PDA or handheld computer (e.g., smartphone), the operating system may be iOS for operating certain devices from Apple Computer, Inc., PalmOS for devices from Palm Computing, Inc., Windows Phone 8 from Microsoft Corporation, Android from Google, Inc., or Symbian from Nokia Corporation. Operating system essentially controls the execution of other computer programs, such as the system, and provides scheduling, input-output control, file and data management, memory management, and communication control and related services.

If computing device is a PC compatible computer, Apple® computer, a handheld device, or the like, the software in memory may further include a basic input output system (BIOS). The BIOS is a set of essential software routines that initialize and test hardware at startup, start operating system, and support the transfer of data among the hardware devices. The BIOS is stored in ROM so that the BIOS can be executed when computing device is activated.

Steps and/or elements, and/or portions thereof of the invention may be implemented using a source program, executable program (object code), script, or any other entity comprising a set of instructions to be performed. Furthermore, the software embodying the invention can be written as (a) an object oriented programming language, which has classes of data and methods, or (b) a procedural programming language, which has routines, subroutines, and/or functions, for example but not limited to, C, C++, C#, Pascal, Basic, Fortran, Cobol, Perl, Java, Ada, Python, Swift, and Lua.

I/O device may include input devices such as a keyboard, a mouse, a scanner, a microphone, a touch screen, a bar code reader, or an infra-red reader. It may also include output devices such as a printer, a video display, an audio speaker or headphone port or a projector. I/O device may also comprise devices that communicate with inputs or outputs, such as a short-range transceiver (RFID, Bluetooth, etc.), a telephonic interface, a cellular communication port, a router, or other types of network communication equipment. I/O device may be internal to computing device, or may be external and connected wirelessly or via connection cable, such as through a universal serial bus port.

When the computing device is in operation, processor is configured to execute software stored within memory, to communicate data to and from memory, and to generally control operations of computing device pursuant to the software. The system and operating system, in whole or in part, may be read by processor, buffered within processor, and then executed.

In the context of this document, a "computer-readable medium" may be any means that can store, communicate, propagate, or transport data objects for use by or in connection with the system. The computer readable medium may be for example, an electronic, magnetic, optical, electromagnetic, infrared, or semiconductor system, apparatus, device, propagation medium, or any other device with similar functionality. More specific examples (a non-exhaustive list) of the computer-readable medium would include the following: an electrical connection (electronic) having one or more wires, a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and stored in a computer memory. The system can be embodied in any type of computer-readable medium for use by or in connection with an instruction execution system or apparatus, such as a computer.

For purposes of connecting to other computing devices, computing device is equipped with network communication equipment and circuitry. In a preferred embodiment, the network communication equipment includes a network card such as an Ethernet card, or a wireless connection card. In a preferred network environment, each of the plurality of computing devices on the network is configured to use the Internet protocol suite (TCP/IP) to communicate with one another. It will be understood, however, that a variety of network protocols could also be employed, such as IEEE 802.11 Wi-Fi, address resolution protocol ARP, spanning-tree protocol STP, or fiber-distributed data interface FDDI.

It will also be understood that while a preferred embodiment of the invention is for each computing device to have a broadband or wireless connection to the Internet (such as DSL, Cable, Wireless, T-1, T-3, OC3 or satellite, etc.), the principles of the invention are also practicable with a dialup connection through a standard modem or other connection means. Wireless network connections are also contemplated, such as wireless Ethernet, satellite, infrared, radio frequency, Bluetooth, near field communication, and cellular networks. In certain aspects, standalone systems not requiring connectivity to other systems are also contemplated.

Disclosed are methods and systems for issuing a redeemable electronic reward to an event participant in response to event attendance, the methods and systems including: (a) establishing a timeframe and geographic location for qualifying the event participant to participate in an event; (b) transmitting a first signal during the event to a peripheral device of the event participant; (c) receiving, by the peripheral device of the event participant, the first signal transmitted during step (b) to identify geographic location by global positioning coordinates of the event participant; (c) transmitting, by the peripheral device of the event participant, a second signal having the identified geographic location by global positioning coordinates of the event participant to a central database responsive to receiving the first signal by the peripheral device of the event participant; (d) associating a timestamp including the geographic location of the event participant during the event upon receiving the second signal by the central database; (e) verifying the timestamp and determining whether the event participant qualifies for the redeemable electronic reward based the timeframe and geographic location identified in the timestamp; (f) optionally authenticating event participant identity before communicating the redeemable electronic reward to the event participant; and (g) communicating the redeemable electronic reward in to the event participant upon determining event participant qualification to participate in the event, wherein: the redeemable electronic reward comprises at least one of a gift card, backstage passes to the event, tickets and backstage passes to a future live event, digital memorabilia from the event, and combinations thereof. In certain aspects, the disclosed methods occur in real-time and utilize a combination of time and participation data from the event to communicate and/or issue awards to participants. In certain aspects, participation and authentication is associated with the specific carrier signal and time/date confirmation by a host computer. In certain aspects, the time/date stamp is crucial, and once the event (concert, game, etc.) is over, incentives (e.g., redeemable electronic reward) are no longer obtainable.

In certain aspects, the method includes authenticating event participant identity before communicating the redeemable electronic reward to the event participant.

In certain aspects, authenticating event participant identity includes verifying event participant's account information from their device (e.g., Apple account, Apple Pay account, Google Play account, YouTube account, etc.), a biometric parameter, or a combination thereof.

In certain aspects, the biometric parameter includes an electronic fingerprint of the event participant, facial recognition of the event participant, or a combination thereof.

In certain aspects, the biometric parameter includes an electronic fingerprint of the event participant and facial recognition of the event participant in which a 95% confidence level must be achieved before communicating the redeemable electronic reward to the event participant.

In certain aspects, the biometric parameter comprises an electronic fingerprint of the event participant and facial recognition of the event participant in which a 99% confidence level must be achieved before communicating the redeemable electronic reward to the event participant.

In certain aspects, the electronic reward is digital memorabilia from an author, musician, or athlete conducting the event.

In certain aspects, the digital memorabilia is an electronic autograph, an electronic written message, an electronic video message, or a combination thereof, which optionally includes a certificate of authentication. In certain aspects, the digital memorabilia is an electronic autograph, an electronic written message, an electronic video message, or a combination thereof including a certificate of authentication.

In certain aspects, the digital memorabilia may be transferable to another person's peripheral device for other forms of digital memorabilia or for remuneration. In certain aspects, the number of exchanges may be limited to one exchange between the event participant and another person (i.e., another person's peripheral device).

Figure 2:
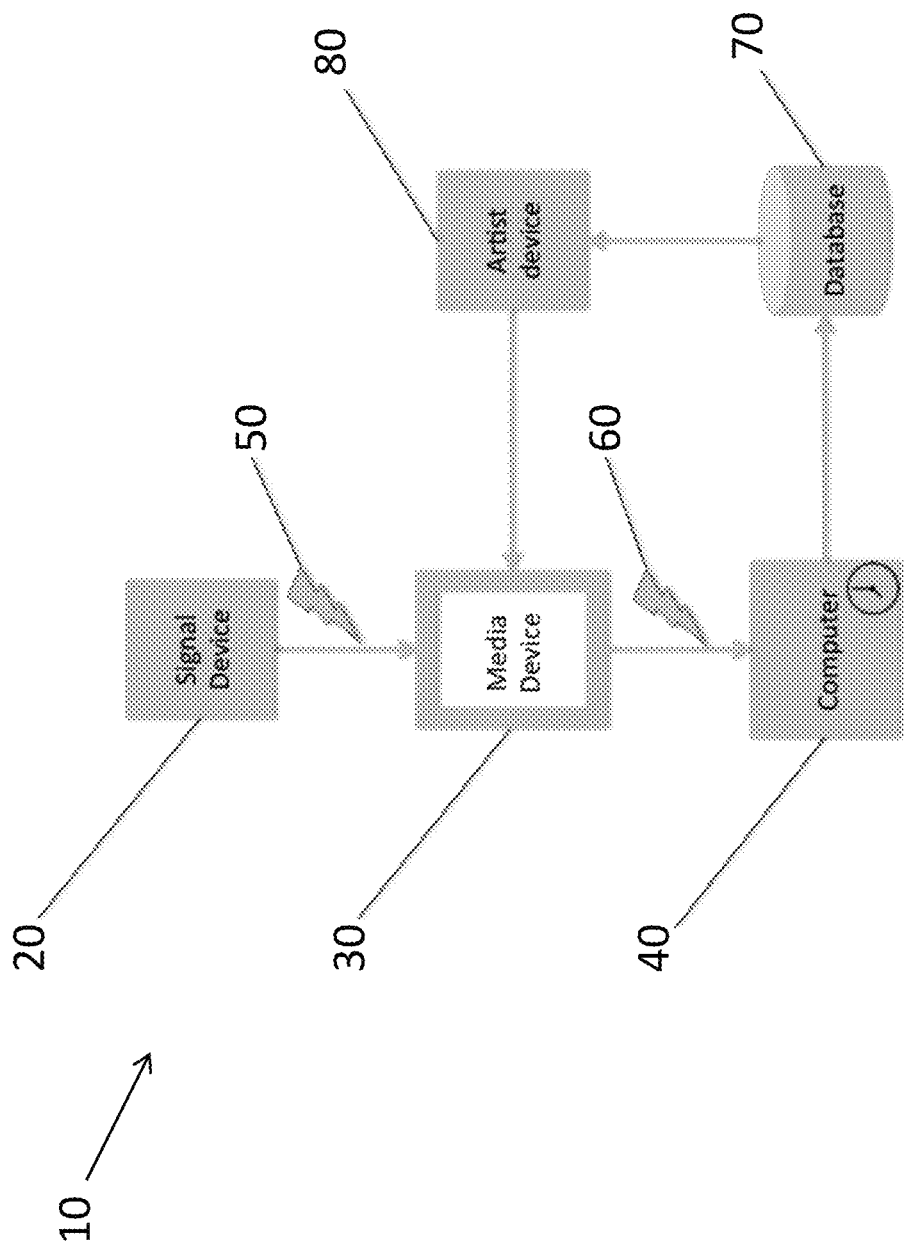
FIG. 2 depicts exemplary signal transmissions during an event confirming an event participant's participation in the event and providing a redeemable electronic reward based on confirmed event participation.
Figure 3:
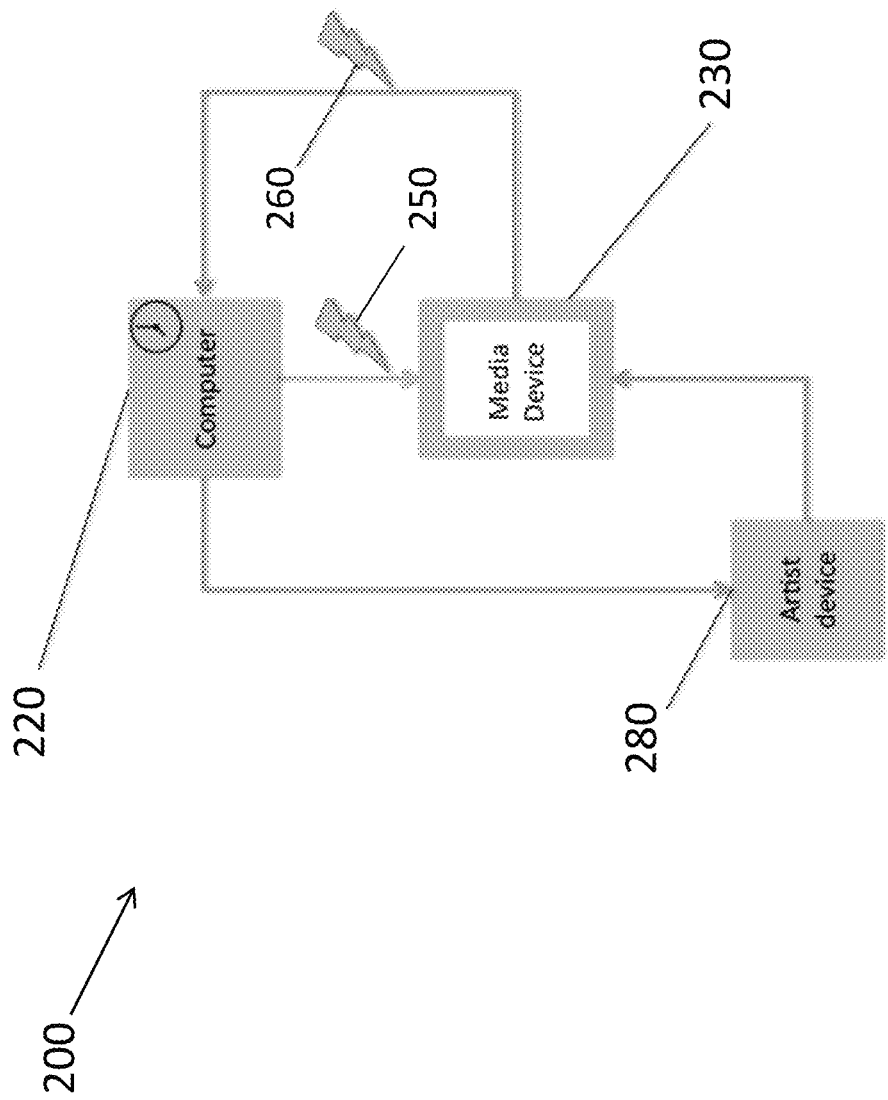
FIG. 3 depicts another exemplary embodiment of the disclosed systems and methods.

FIGS. 1-3 depict exemplary systems and methods for issuing a redeemable electronic reward to an event participant in response to event attendance. For example, FIGS. 1-3 depict various embodiments 10, 200 of two factor time and space systems and methods used to confirm an event participant's participation in an event either in person or online. For example, with specific reference to FIGS. 1 and 2, a broadcast generator component 20 (e.g., a "signal device") transmits signal 50 to a potential event participant's media device 30 (i.e., a peripheral device including a smart phone, table, laptop, etc.), and signal 50 is received and captured by the event participant's media device 30, using a software application, which identifies the geographic location of the event participant.

The event participant's media device 30, using the software application, subsequently transmits a second signal 60 including the event participant's geographic location to computer 40, as well as the time thereby providing a time and date stamp for subsequent authentication. After computer 40 receives the second signal 60 from the event participant's media device 30 thereby providing the time and date stamp, this time and date stamp is verified to determine the event participant's participation in the event.

After verifying the time and date stamp, the event participant's identity is optionally authenticated before communicating the redeemable electronic reward to the event participant. This provides an extra layer of security and confirmation that the electronic reward will be communicated to the proper recipient/event participant associated with the event participant's media device 30. In certain aspects, this optional authentication is performed by the computer 40, a third party vendor, or a combination thereof, and in certain aspects, this authentication can be performed substantially in real time. Authenticating the event participant's identity includes verifying a biometric parameter such as authenticating an electronic fingerprint of the event participant, facial recognition of the event participant, or a combination thereof. In certain aspects, the biometric parameter includes an electronic fingerprint of the event participant and facial recognition of the event participant in which a 95% confidence level based on look up tables and previously submitted reference samples must be achieved before communicating the redeemable electronic reward to the event participant. In certain preferred aspects, the biometric parameter includes an electronic fingerprint of the event participant and facial recognition of the event participant in which a 99% confidence level based on look up tables and previously submitted reference samples must be achieved before communicating the redeemable electronic reward to the event participant. In certain preferred aspects, authenticating the event participant's identity is mandatory before communicating the redeemable electronic reward.

After verifying the event participant's participation in the event and further referring to FIG. 2, computer 40 sends notification to database 70 and subsequently to, for example, the event provider's device 80 (e.g., author, musician, athlete, etc.) confirming participation in the event. This notification allows the event provider (e.g., author, musician, athlete, etc.) to reward the established/authenticated event participant's participation in the event with a redeemable electronic reward including, but not limited to, a gift card, backstage passes to the current event, tickets and backstage passes to a future live event, digital memorabilia from the event, and combinations thereof. In certain aspects, the event participant may select the redeemable electronic reward; however, in other aspects, the redeemable electronic reward is predetermined. As shown in FIG. 2, this redeemable electronic reward is subsequently communicated to the event participant's device from, for example, the event provider's device 80.

For example, after the event participant's participation in the event is established and confirmed, the event provider's device (e.g., author, musician, athlete, etc.) 80 receives notification whereupon the event provider can provide the event participant with the redeemable electronic reward, which, in certain aspects, includes communicating a generic and/or personalized message to the event participant's media device 30. These generic and/or personalized messages include an electronic autograph, an electronic written message, an electronic video message, or a combination. With regard to personalization of these messages, the event provider may formally address the event participant by their name. In certain aspects, the communicated generic and/or personalized message may further include a certificate of authentication having for example, the date which the message was authenticated and the confidence level of authenticity (e.g., 95%, 99%, 100% level of confidence). For example, the certificate of authentication may be generated by a scoring number associated with event provider's signature (and/or writing samples), voice recognition, facial recognition, or a combination thereof. The event provider's autograph or electronic written message, for example, must achieve at least a 90% confidence level based on an X,Y array coordinates including a statistical comparison of velocity between coordinates and relative position of points between coordinates and the voice message, video message, or combination thereof, if present, must achieve at least a 90% confidence level based on amplitude and frequency and/or facial recognition when compared to reference samples of the event provider. Facial recognition can be calculated using a two dimensional mapping matrix comparing X,Y array coordinates of the event provider and comparing these values to a control, reference sample. In other aspects, the event provider's electronic signature or the electronic written message must achieve at least a 95% confidence level based on an X,Y array coordinates including a statistical comparison of velocity between coordinates and relative position of points between coordinates and the voice message, video message, or combination thereof, if present, must achieve at least a 95% confidence level based on amplitude and frequency and/or facial recognition when compared to reference samples of the event provider. In additional aspects, the electronic signature and the electronic written message must achieve at least a 99% confidence level based on an X,Y array coordinates including a statistical comparison of velocity between coordinates and relative position of points between coordinates and wherein at least one of the voice message, the video message, or a combination thereof and must achieve at least a 99% confidence level based on amplitude and frequency and/or facial recognition when compared to reference samples of the event provider.

As alluded to above and preferably after the above mentioned authentication steps (e.g., authenticating event participant's identity, authenticating provider's redeemable electronic reward such as a generic and/or personalized message, or a combination thereof), the redeemable electronic reward is subsequently communicated to the event participant's device for participating (e.g., attending) the event, and in certain aspects, this method may occur in real time or substantially real time. In certain aspects, the redeemable electronic reward (e.g., the generic and/or personalized messages) may be transferable to another person's peripheral device for other forms of digital memorabilia or for remuneration. In certain aspects, the number of exchanges may be limited to one exchange between the event participant and another person (i.e., another person's peripheral device) to prevent unauthorized copying and mass distribution of the redeemable electronic reward.

FIG. 3 depicts a second embodiment 200 of the disclosed systems and methods in which, the signal generator, computer, and database need not be separate items, as depicted in FIGS. 1 and 2, depending on the chosen configuration of the system. For example, computer 220 can be configured to generate the first signal 250 and receive the second signal 260 transmitted by the event participant's peripheral device 230. In certain aspects, a software application loaded on the event participant's peripheral device sends the second signal 260 back to the computer 220 where, similar to the above mentioned first embodiment, the time stamp is associated with the event participant's geographic location during the event and subsequently verified to determine whether the event participant qualifies for the redeemable electronic reward based on timeframe and geographic location identified in the timestamp. If the event participant is determined to qualify for the redeemable electronic reward, the event participant's identity may be authenticated, similar to the above discussed first embodiment, before communicating the redeemable electronic reward to the event participant.

Upon determining event participation, computer 220 sends notification to the event provider's device 280 (e.g., author, musician, athlete, etc.) confirming participation in the event. This notification allows the event provider (e.g., author, musician, athlete, etc.) to reward the established/authenticated event participant's participation in the event with a redeemable electronic reward including, but not limited to, a gift card, backstage passes to the event, tickets and backstage passes to a future live event, digital memorabilia from the event, and combinations thereof. In certain aspects, the event participant may select the redeemable electronic reward; however, in other aspects, the redeemable electronic reward is predetermined.

As shown in FIG. 3, this redeemable electronic reward is subsequently communicated to the event participant's device. For example, as shown in FIG. 3, after the event participant's participation in the event is established and confirmed, the event provider's device (e.g., author, musician, athlete, etc.) 280 receives notification whereupon the event provider can provide the event participant with the redeemable electronic reward, which in certain aspects includes a communicating a generic and/or personalized message to the event participant's media device 30. These generic and/or personalized messages include an electronic autograph, an electronic written message, an electronic video message, or a combination. With regard to personalization and similar to the first embodiment, the event provider may formally address the event participant by their name. In certain aspects, the communicated generic and/or personalized message may further include a certificate of authentication having for example, the date which the message was authenticated and the confidence level of authenticity (e.g., 95%, 99%, 100% level of confidence).

In each of the above embodiments, the redeemable electronic reward from the event provider artist can further be printed and enjoyed in the physical realm or cashed in during a live event (tickets, back stage passes, meet-n-greets, merchandise, etc.) if desired.

In yet another aspect, disclosed is a non-transitory computer readable medium embodying a program executable in a computing device for issuing a redeemable electronic reward in real-time to an event participant in response to event attendance, the program including: (a) establishing a timeframe and geographic location for qualifying the event participant to participate in an event; (b) transmitting a first signal during the event to a peripheral device of the event participant; (c) receiving, by the peripheral device of the event participant, the first signal transmitted during step (b) to identify geographic location by global positioning coordinates of the event participant; (c) transmitting, by the peripheral device of the event participant, a second signal having the identified geographic location by global positioning coordinates of the event participant to a central database responsive to receiving the first signal by the peripheral device of the event participant; (d) associating a timestamp including the geographic location of the event participant during the event upon receiving the second signal by the central database; (e) verifying the timestamp and determining whether the event participant qualifies for the redeemable electronic reward based the timeframe and geographic location identified in the timestamp; (f) optionally authenticating event participant identity before communicating the redeemable electronic reward to the event participant; and (g) communicating the redeemable electronic reward in real-time to the event participant upon determining event participant qualification to participate in the event, wherein: the redeemable electronic reward includes at least one of a gift card, backstage passes to the event, tickets and backstage passes to a future live event, digital memorabilia from the event, and combinations thereof.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A method for issuing a redeemable electronic reward in real-time to an event participant in response to event attendance upon electronically confirming the event participant's participation therein, the method comprising:
(a) establishing a timeframe for qualifying the event participant to participate in an event in which the event is an authorized live-streamed broadcast event or authorized rebroadcast over the Internet configured to be received or captured by a peripheral device of the event participant;
(b) transmitting during the event a first signal that is embedded within the event to the peripheral device of the event participant;
(c) receiving, by the peripheral device of the event participant, the first signal transmitted during step (b) to identify event attendance of the event participant;
(d) transmitting, by the peripheral device of the event participant, a second signal from the event participant to a central database confirming event attendance of the event participant;
(e) associating a timestamp of the event participant during the event upon receiving the second signal by the central database;
(f) verifying, by the central database, the timestamp and determining whether the event participant qualifies for the redeemable electronic reward based on the timeframe and receipt of the second signal;
(g) authenticating event participant identity by verifying account information from the device of the event participant and a biometric parameter before communicating the redeemable electronic reward to the event participant, the biometric parameter must achieve a predetermined confidence level before communicating the redeemable electronic reward to the event participant; and
(h) an event provider participates in the event by communicating the redeemable electronic reward in real-time to the event participant upon determining event participant qualification to participate in the event, the redeemable electronic reward comprises a personalized message comprising an electronic autograph, an electronic video message, or a combination thereof, wherein:
the redeemable electronic reward is transferable for a limited number of times between the peripheral device of the event participant and another peripheral device.

2. The method of claim 1, wherein the biometric parameter comprises an electronic fingerprint of the event participant and facial recognition of the event participant in which a 99% confidence level must be achieved before communicating the redeemable electronic reward to the event participant.

3. The method of claim 2, wherein the digital memorabilia is an electronic autograph, an electronic written message, an electronic video message, or a combination thereof, which includes a certificate of authentication.

4. The method of claim 1, wherein the method consists of steps (a)-(h).

5. The method of claim 1, wherein the authorized rebroadcast comprises an old movie, prior concert, or prior sporting event that includes a livestream of an original participant within the old movie, prior concert, or sporting event who concurrently watches or listens to the authorized rebroadcast alongside the event participant and actively participates therein by providing the event participants with the redeemable electronic reward in real time.

6. The method of claim 5, wherein the original participant is a celebrity, author, musician, athlete, or a combination thereof.

* * * * *